United States Patent Office 2,754,137
Patented July 10, 1956

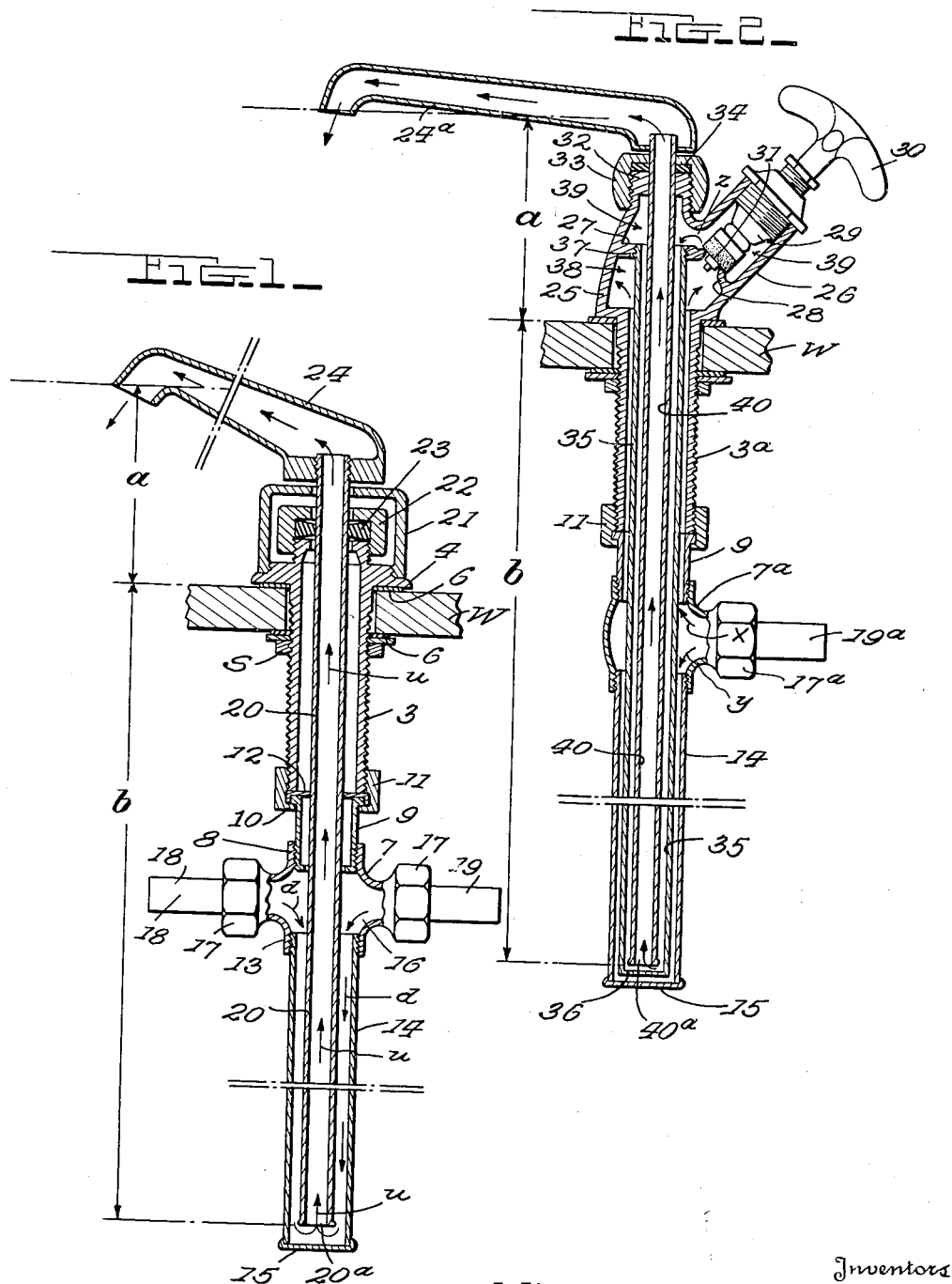

2,754,137

ADJUSTABLE WATER SUPPLY UNIT FOR WASHSTANDS AND THE LIKE

Miguel Gine and Juan Carnice, Barcelona, Spain

Application March 9, 1950, Serial No. 148,598

1 Claim. (Cl. 285—165)

This invention relates to certain new and useful improvements in adjustable water supply units for washstands, tubs and the like.

Pipes or faucets which supply water directly to washstands, tubs and the like remain fixed in the position in which they have been installed and for that reason it is impossible to vary the clearance between the mouth of the faucet and the base of the washstand.

It is impossible to alter the direction of the stream of water because the pipe forms one sole piece with its holding plate or with the body of the faucet which limits the use to which they can be adapted, and for certain special washing operations, such as the washing of the head under a direct stream of water, there is not a sufficient altitude or clearance for placing the head under the pipe or faucet and above the bottom of a wash basin.

The present invention has for its primary object to provide an adjustable pipe and faucet for washstands, bath tubs and the like wherein the pipe and faucet are both extensible and rotary so that the direction of the stream of water issuing from the faucet may be changed and the distance between the mouth of the faucet and the base of the receptacle may be increased or reduced at the will of the user whereby one may perform various operations, such as the washing of the head in entire comfort.

It is a further object of the invention to provide a longitudinally adjustable pipe for a nozzle in a bathroom fitting which includes a mixing chamber, receiving hot or cold water individually valve-controlled and also to provide such a fitting having a control valve forming an integral part thereof.

With the above and other objects in view that will become apparent as the nature of the invention is better understood, the same consists in the novel form, combination and arrangement of parts hereinafter more fully described, shown in the accompanying drawing, and claimed.

In the accompanying drawing:

Figure 1 is a vertical sectional view showing the vertically and rotatably adjustable pipe carrying a discharge nozzle with means for supplying hot and cold water selectively thereto, and Figure 2 is a vertical sectional view of another form of the invention wherein the vertically and rotatably adjustable pipe carrying a nozzle has a water control valve directly associated therewith.

Referring more in detail to the accompanying drawing, there is indicated in detail the elements forming the structure of the vertically adjustable pipe wherein the pipe carrying the nozzle may also be rotatably adjusted to control the direction of flow of a water stream issuing from the nozzle, and, as illustrated in Figure 1, the reference numeral 3 designates an externally threaded tubular fitting having an annular flange 4 adjacent its upper end for seating on the wall W of a washstand or the like and held in position thereon by means of the nut 5 threaded on the fitting 3 below the wall for clamping cooperation with the flange 4 to hold the fitting in position, it being understood that packing material of a suitable nature or a gasket 6 is confined between the fitting and the wall W.

A two-way fitting 7 carries an upstanding internally threaded tubular boss 8 into which a relatively short pipe section 9 is threaded and said pipe section 9 carries an outwardly directed flange 10 at its upper end that is engaged by the flanged nut 11 threaded onto the lower end of the tubular fitting 3, a gasket or like seal 12 having a central opening therein being interposed between the lower end of the tubular fitting 3 and the upper end of the pipe section 9. An internally threaded tubular boss 13 depends from the two-way fitting 7 in line with the upstanding boss 8 and threadedly receives the upper end of the tubular member 14 that is alined with the fitting 3 and is closed at its lower end as at 15. The two-way fitting 7 provides a chamber 16 having opposite horizontally alined couplings 17 for the attachment of conduits 18 and 19 respectively for hot and cold water.

A vertically and rotatably adjustable pipe 20 is mounted in the tubular fitting 3 and tubular member 14 and has a water-tight sliding fit in the gasket 12, the pipe in its lowest position having the lower open end 20$^a$ thereof terminating above the closed bottom 15 of the tubular member 14 and in such position the pipe is of a length to extend above the upper end of the tubular fitting 3. As illustrated in Figure 1, the marginal edge of the flange 4 is rabbeted and externally threaded for the mounting of a casing or hood 21 with a central opening therein for the passage of the pipe 20 and the upper end of said tubular fitting 3 above the flange 4 and within the casing 21 is externally threaded for the mounting of the nut 22 having a top opening for the passage of the pipe and within said nut 22 there is provided a flexible and compressible gasket 23 that has water-tight engagement with the external wall of the pipe 20.

A nozzle 24 of appropriate design has a water-tight threaded engagement with the upper end of the pipe 20.

It will be understood from an inspection of Figure 1 that when water from either or both conduits 18 and 19 is delivered into the chamber 16 of the two-way fitting 7, the gasket 12 positioned above said fitting will cause the water to flow downwardly in the direction of the arrows $d$ to the lower end of the tubular member 14 to enter the lower open end 20$^a$ of the pipe 20 and to flow upwardly through said pipe, as indicated by the arrows $u$, to the nozzle 24 for discharge therefrom. The pipe 20 is rotatably supported in the fitting elements so that the nozzle may be swung from one side to the other and said pipe 20 also has vertically spaced supporting points afforded by the gaskets 12 and 23. With such construction, the pipe 20 may be vertically extended to vary the distance between the discharge end of the nozzle end 24 and the bottom of a wash basin, stand, or tub or the like, so as to afford the comfortable positioning of the head of a person beneath the discharge end of the faucet when washing the head.

It will be observed that the lower open end 20$^a$ of the pipe 20 is flanged outwardly so as to limit upward sliding movement of the pipe and to prevent complete removal thereof from the fitting, such lower end flanged portion passing upwardly beyond the gasket 12 and moving into contact with the upper end of the tubular fitting 3 below the gasket 23. The normal position of the discharge end of the nozzle 24 with respect to the wall 12 of the plumbing fixture is indicated by the line $a$, while the length of the vertical adjustment of the pipe 20 is the length of the line indicated at $b$. It will be further understood that the compressive contact of the gasket 23 with the pipe 20 will be sufficient to overcome the pressure or flow of water through the pipe and nozzle so that the pipe and nozzle will remain in their vertical or rotarily adjusted positions. The gasket 23 is readily accessible above the wall W for replacement should it be required as it is only necessary to release the casing or hood 21 from the upper end of the tubular fitting and similarly release the nut 22 to permit access to said gasket.

In the form of invention illustrated in Figure 2, the fitting has a water control valve directly associated therewith and, as illustrated, the reference character 3ª designates an externally threaded tubular fitting similar to the fitting shown in Figure 1 with a nut 11 at the lower end thereof supporting the pipe section 9 and to which a T-fitting 7ª is attached, the leg of the T having a connector 17ª for a single conduit 19ª. A tubular member 14 is connected to the lower side of the T-fitting 7ª and is closed at its lower end as at 15.

The upper end of the tubular fitting 3ª is enlarged to provide a head or casing 25 providing a shoulder at its lower end that seats on the wall W of a washstand or the like, and said casing has a tubular member 26 extending angularly and upwardly therefrom. A horizontal partition 27 in the casing 25 terminates at the lower end of the tubular extension 26 and cooperates with a flange 28 on the inner wall of the tubular extension 26 to form a valve seat. A valve fitting 29 is threaded into the outer end of the tubular extension 26 and has a valve stem threaded thereto that is operated by the handle 30 with the valve 31 at the inner end of the valve stem movable into engagement into the valve seat as illustrated.

The upper end 32 of the casing 25 is externally threaded and has a central opening therein for purposes presently to appear, and receives a centrally apertured nut 33, a compressible gasket 34 being interposed between the upper end of the nut 33 and the upper end 32 of the casing 25.

A tubular member 35 is positioned in the tubular fitting 3ª and the tubular member 14 and is closed at its lower end as at 36, being positioned in spaced relation to the closed bottom 15 of the tubular member 14 and the upper end of the member 35 is anchored as at 37 in the partition 27. The foregoing construction provides a chamber 38 in the casing 25 below the partition 27 and valve seat and which chamber is normally closed by the valve 31 and also communicating chambers 39 in the casing 25 and in the tubular member 26 above the valve seat and partition 27.

A pipe 40 open at its lower end as at 40ª is located centrally of the tubular member 35 with the lower open end thereof terminating above the closed lower end 36 of the member 35 and its upper end extends through and above the upper end 32 of the casing 25 and through the compressible gasket 34 for the water-tight and rigid attachment thereto of the nozzle 24ª.

The pipe 40 is both vertically and rotatably adjustable in the fitting and the pressure of the gasket 34 thereon seals the escape of water and confines the flow thereof through the pipe 40 and into the nozzle 24ª. With the valve 31 engaged with its seat, water entering the conduit 19ª flows in the direction of the arrows X and Y to fill the space between the members 14 and 35 and the chamber 38 below the partition 27 and the valve 31. When the valve is unseated, water will then flow into the chamber 39 and downwardly as indicated by the arrow Z between the tubular member 35 and pipe 40 to the lower closed end of the tubular member 35 and then flow upwardly through said pipe 40 into and out of the nozzle 24ª. In this form of the invention, the normal position of the nozzle 24ª with respect to the wall W of the bathroom fitting is indicated by the line and letter $a$, while the length of the vertical adjustment of the pipe 40 is indicated by the line and letter $b$.

It will understood that in either form of the invention it is only necessary to grasp the nozzle 24 or 24ª and impart an upward movement thereto which will raise the vertically adjustable pipe attached thereto to regulate the distance between the nozzle and the wall W of the washstand. It will be further understood that it is only necessary to grasp the nozzle to effect rotatable adjustment of the pipe attached thereto to control the direction of flow of water.

While there are herein shown and described the preferred embodiments of the invention, it is nevertheless to be understood that minor changes may be made therein without departing from the spirit and scope of the invention as claimed.

What is claimed as new, is:

An adjustable water supply unit for wash basins and the like comprising an outer tubular casing formed of upper and lower sections, a two-way fitting connecting the adjacent ends of the sections, the lower end of the lower section being closed and the upper end of the upper section being open, an open-ended pipe mounted in said casing sections so as to be movable therein vertically and rotatably and normally extending above the upper end of the upper casing section, liquid supply means in communication with said two-way fitting, a liquid sealing gasket surrounding the pipe adjacent the lower end of the upper section for directing the liquid downwardly in the lower section for entry into the lower open end of said pipe, and a water-tight compressible gasket surrounding said pipe adjacent the upper end of the upper casing section.

References Cited in the file of this patent

UNITED STATES PATENTS

| | | |
|---|---|---|
| 543,709 | Simpson | July 30, 1895 |
| 1,360,382 | Edwards | Nov. 30, 1920 |
| 2,348,238 | Beeke | May 9, 1944 |